J. K. DELANO.
ELECTRICAL SYSTEM FOR MOTOR VEHICLES.
APPLICATION FILED DEC. 15, 1916.
1,391,880.
Patented Sept. 27, 1921.
6 SHEETS—SHEET 1.
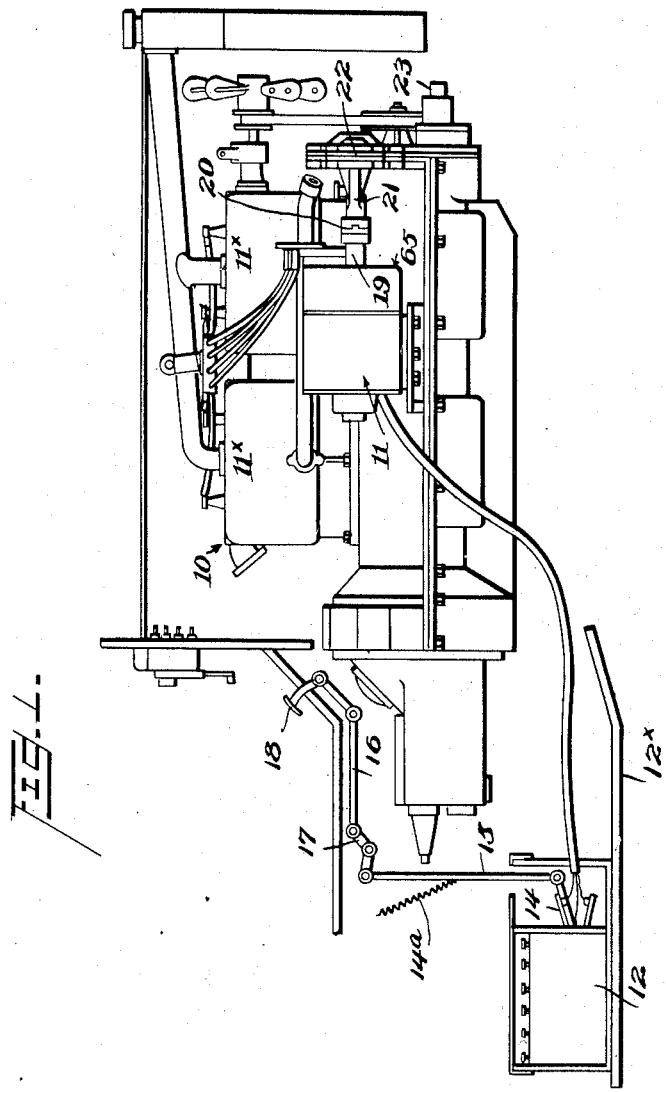
Witness
Harold Strauss
Inventor
James K. Delano
By
His Attorney

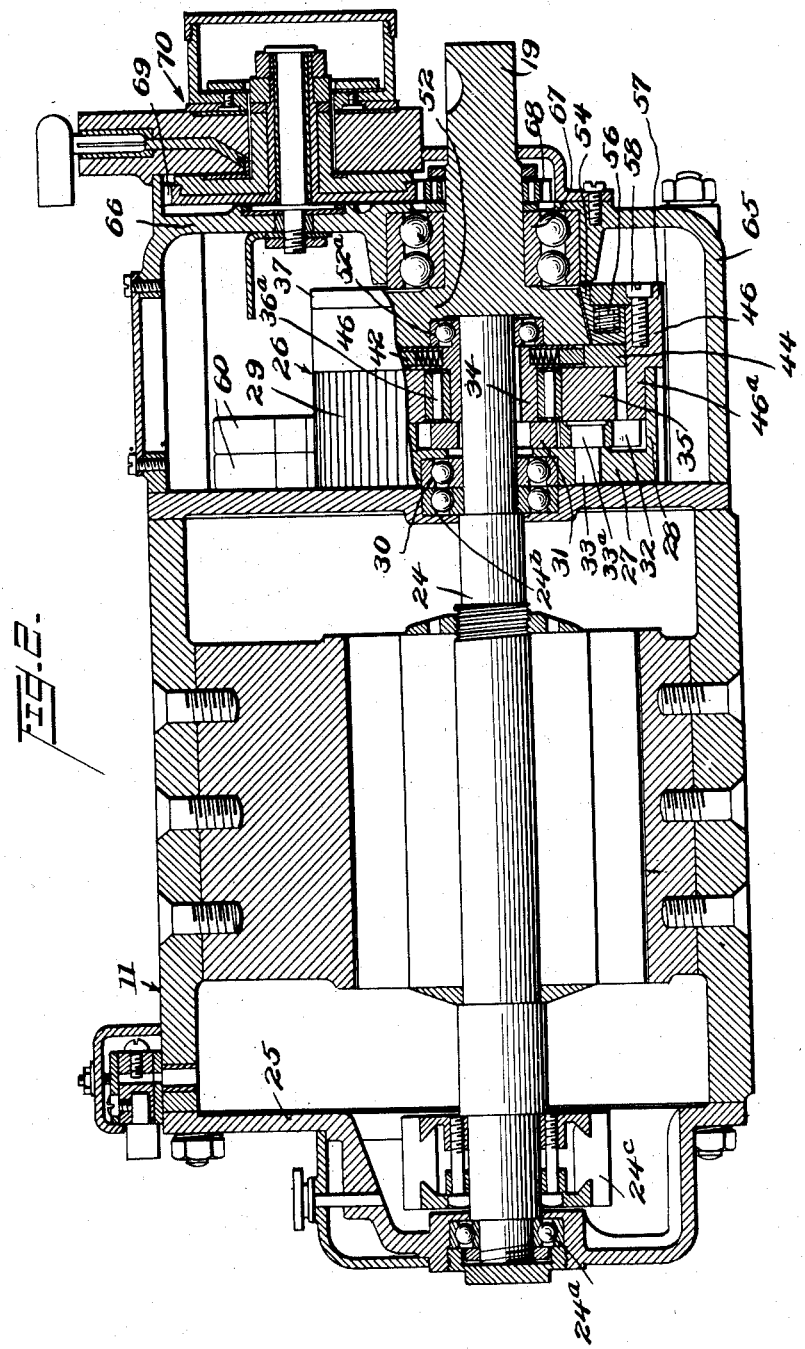

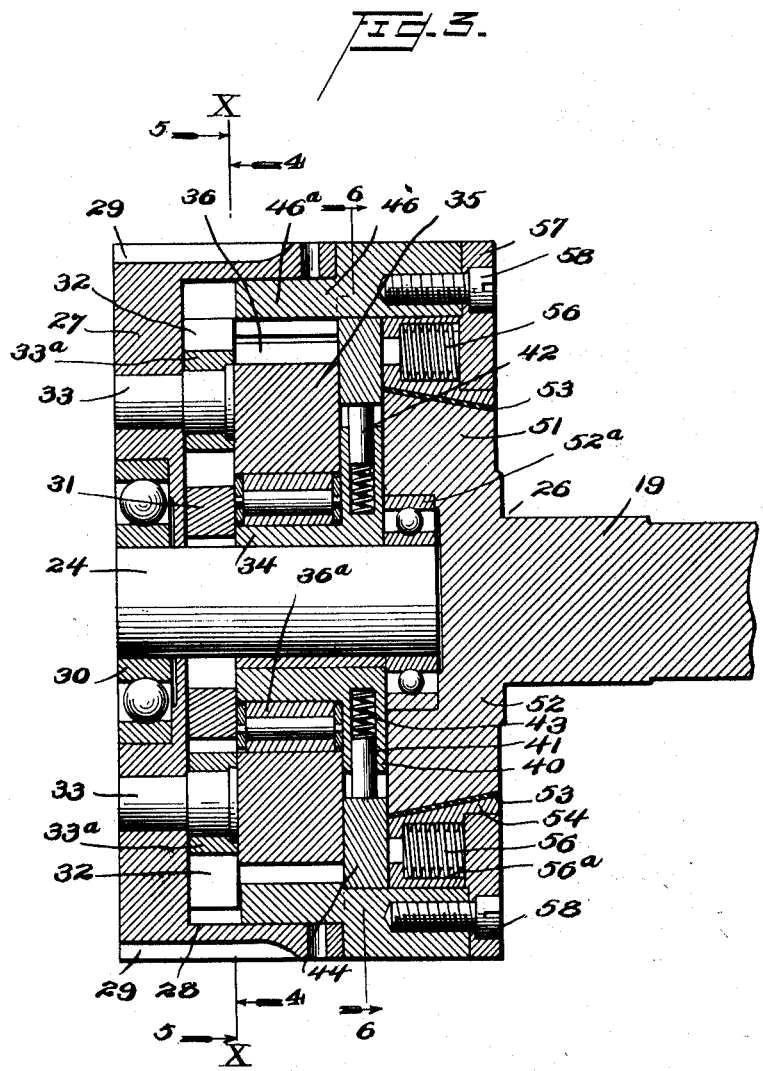

J. K. DELANO.
ELECTRICAL SYSTEM FOR MOTOR VEHICLES.
APPLICATION FILED DEC. 15, 1916.
1,391,880.  Patented Sept. 27, 1921.
6 SHEETS—SHEET 4.
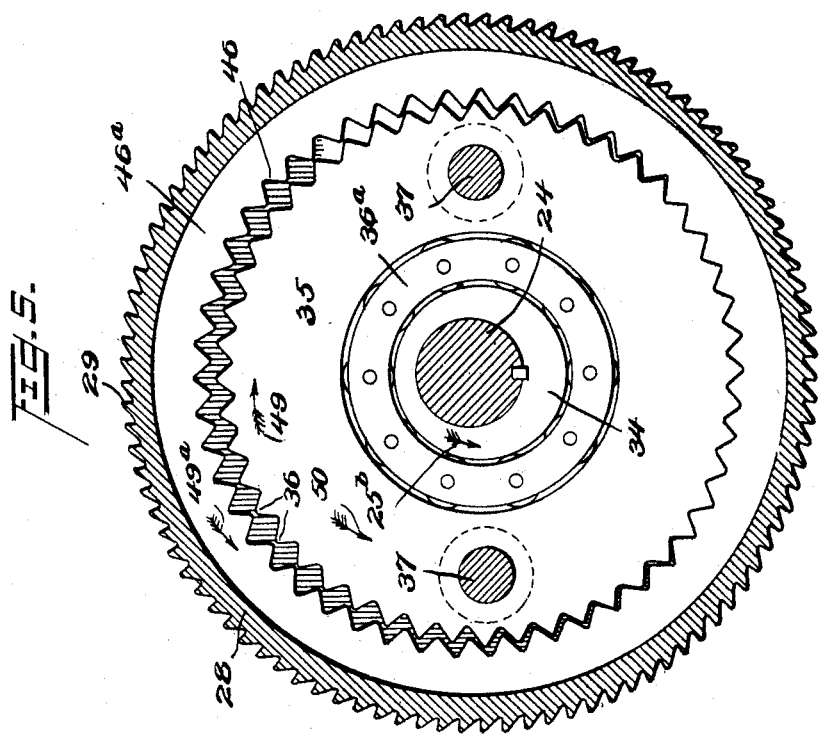
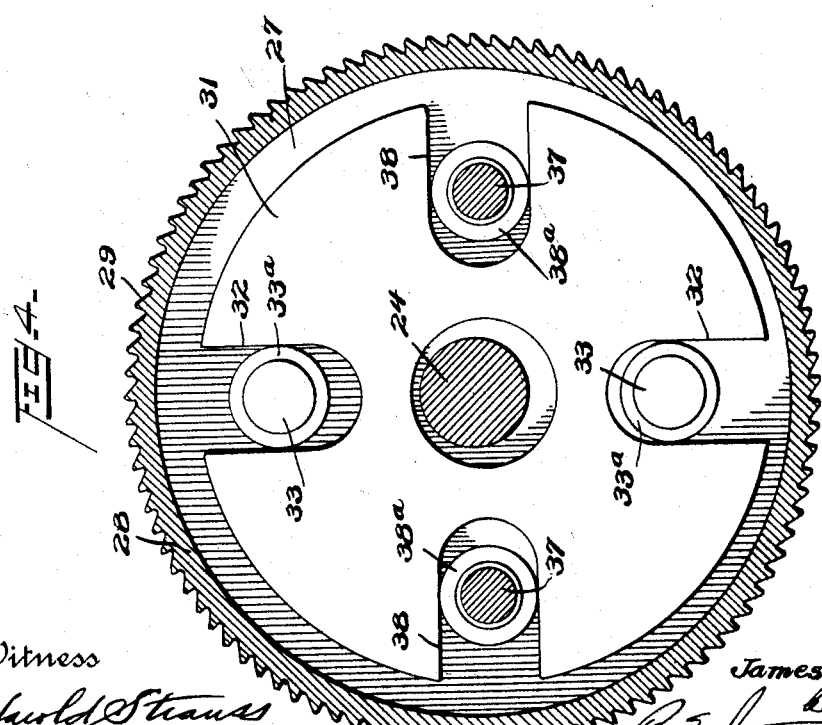
Witness
Harold Strauss
Inventor
James K. Delano
by R. F. Steward
his Attorney

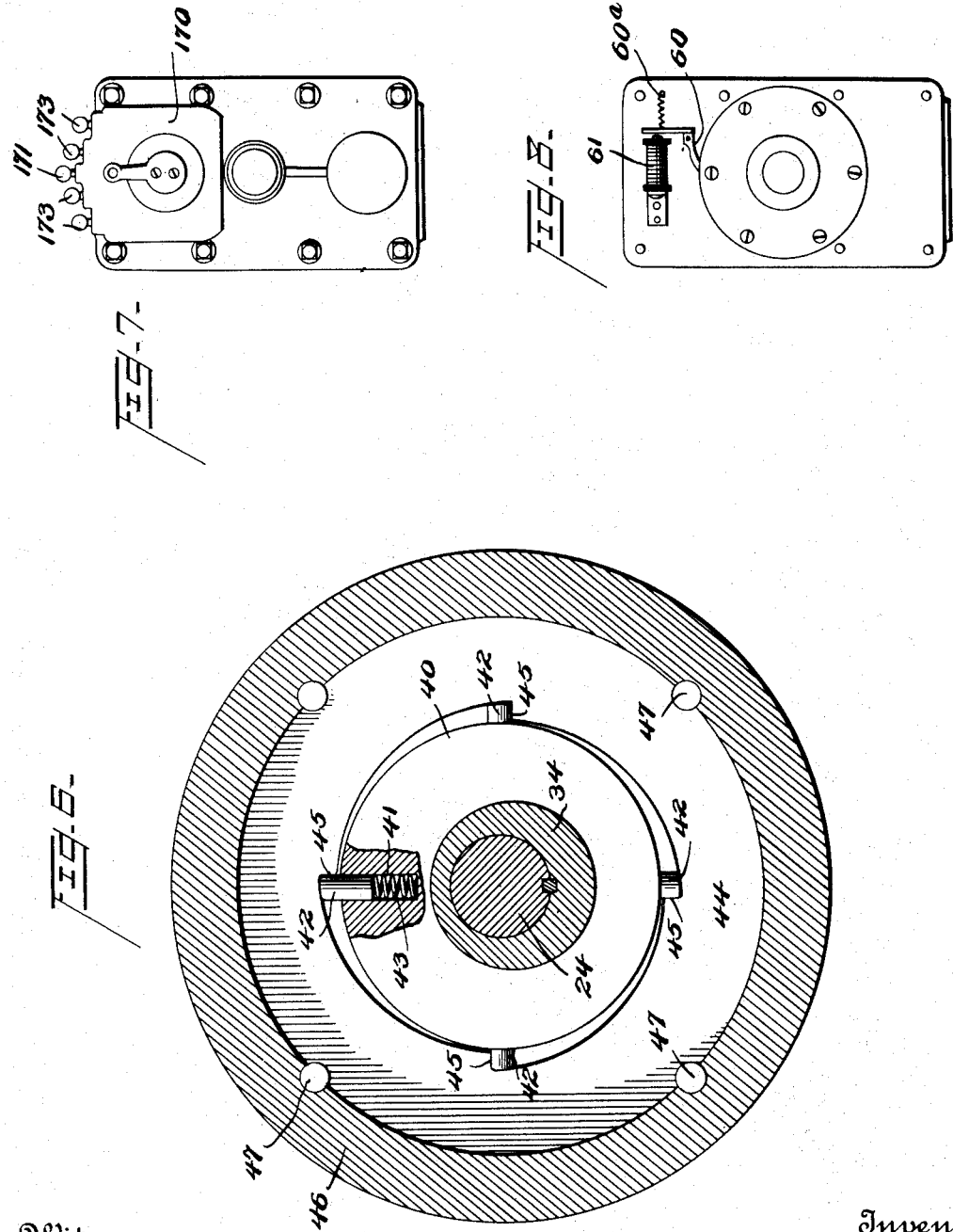

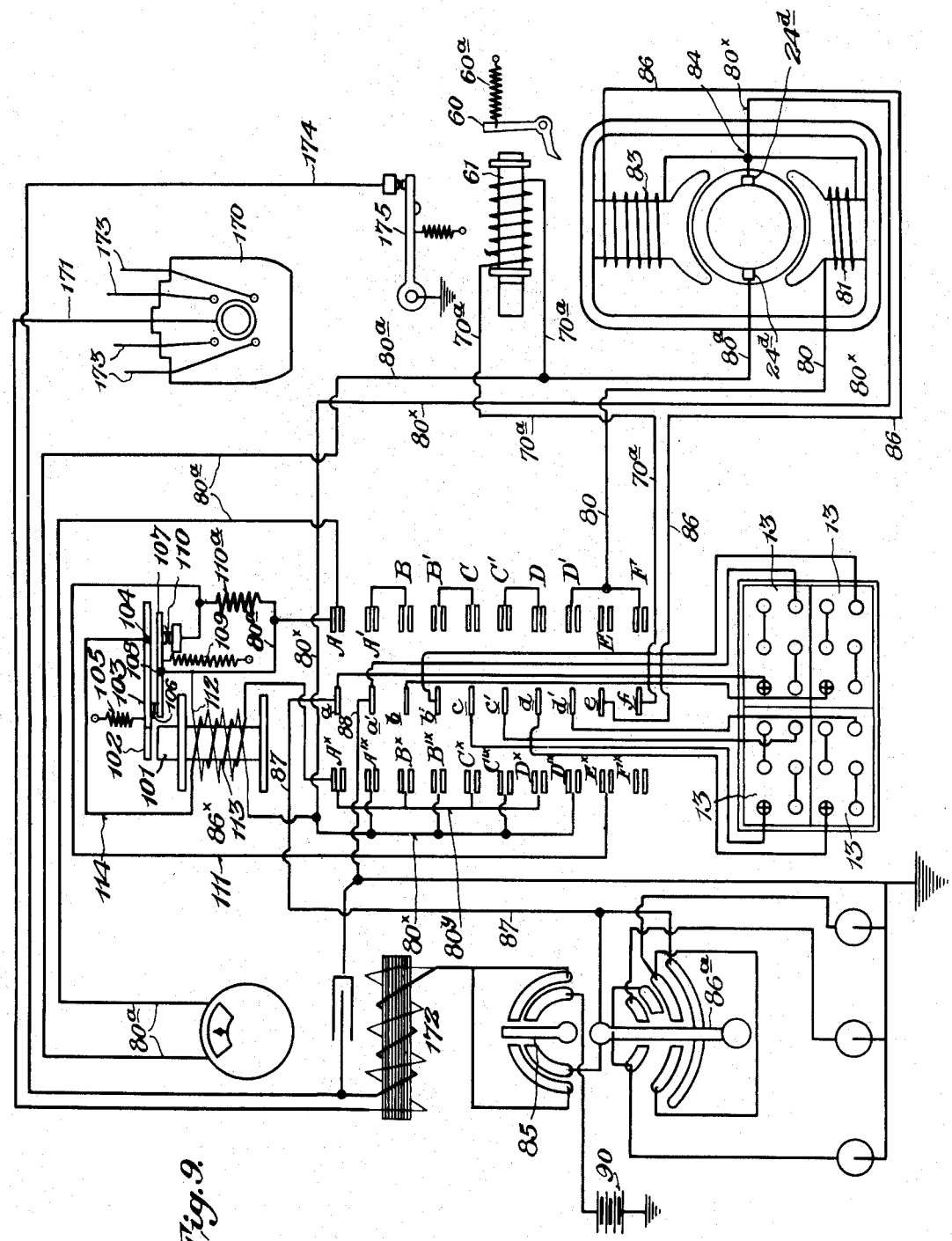

UNITED STATES PATENT OFFICE.

JAMES K. DELANO, OF NEW YORK, N. Y.

ELECTRICAL SYSTEM FOR MOTOR-VEHICLES.

1,391,880.  Specification of Letters Patent.  Patented Sept. 27, 1921.

Original application filed December 20, 1912, Serial No. 737,815. Divided and this application filed December 15, 1916. Serial No. 137,180.

*To all whom it may concern:*

Be it known that I, JAMES K. DELANO, a citizen of the United States, residing at New York, in the county of New York and State of New York, have invented certain new and useful Improvements in Electrical Systems for Motor-Vehicles; and I do hereby declare the following to be a full, clear, and exact description of the invention, such as will enable others skilled in the art to which it appertains to make and use the same.

This invention relates to electrical systems for motor vehicles; and it relates more particularly to electrical systems to be used on vehicles propelled by internal combustion engines.

A system embodying the principles of the invention comprises a direct current dynamo electric machine arranged to be driven by an internal combustion engine and to charge a storage battery. In order to regulate or limit the charging current, the field winding of the dynamo electric machine is so arranged that when the charging current tends to become excessive due to high rotative speeds, the current flowing through the field winding is diminished. The dynamo electric machine is also arranged, in conjunction with the battery, to furnish ignition current which is supplied to the engine spark plugs through the medium of suitable distributing and interrupting mechanism geared to the armature shaft of the dynamo electric machine.

In its most desirable embodiment, the invention comprises a combined starting, lighting and ignition system, the dynamo electric machine being a dynamo motor, that is, a machine adapted to operate either as a generator to supply current to the storage battery and ignition system, or to take current from the storage battery and to run as a motor for the purpose of starting the internal combustion engine to which it is suitably geared. In the example here chosen for the purposes of illustration, the dynamo motor is connected to the engine shaft through special speed reducing gearing for a purpose which will hereinafter appear. This particular form of gearing is not an essential part of the invention herein claimed, but is claimed in my copending application Serial No. 737,815, filed December 20, 1912, of which the present application is a division. For the sake of a complete disclosure in the present application, however, said gearing will be hereinafter described in detail.

Apparatus embodying the broad principles of my invention is illustrated in the accompanying drawings, in which:

Figure 1 is a side elevation of an engine in position on the front of an automobile with the improved system in proper relation thereto;

Fig. 2 is a longitudinal central section through the dynamo motor and gear connection;

Fig. 3 is a longitudinal central section on an enlarged scale through the speed reduction gearing and clutch mechanism connecting the dynamo motor shaft with the engine shaft;

Fig. 4 is a vertical section on the line X—X of Fig. 3, the section being viewed as indicated by the arrows 4—4;

Fig. 5 is a similar section viewed as indicated by the arrows 5—5;

Fig. 6 is a vertical section on the lines 6—6 of Fig. 3;

Figs. 7 and 8 are detail end elevations to be referred to more particularly later;

Fig. 9 is a view representing diagrammatically my improved system and the various electric circuits included therein.

Referring now to that embodiment of my invention illustrated in the drawings, 10 indicates a gasolene engine (see Fig. 1) of any familiar type used in driving automobiles. 11 indicates a direct current dynamo electric machine, in this instance a dynamo motor, which is adapted, when supplied with current, to run as a motor to start the engine shaft and, after the engine shaft is running under its own power, at the necessary speed, to run as a generator and supply electric current for the ignition of the engine, for lighting purposes and for charging a storage battery which supplies current for the ignition when starting and running the engine. Said dynamo motor is mounted on the crank case of the engine adjacent to engine cylinders $18^x$. 12 indicates a storage battery which may be mounted in any convenient place on the automobile frame and is shown mounted on the running board $12^x$ of the automobile adjacent to the driver's seat.

Said storage battery, as shown diagrammatically in Fig. 9, preferably includes four separate six volt units 13 and is provided with a double switch 14 (Fig. 1) adapted to be operated through links 15, 16 and a rocking bell crank lever 17 by means of a pedal 18 projecting upwardly from the floor of the automobile. Said switch in its normal position, in which it is held by means of a coiled spring 14ª, connects said battery units in multiple. This is the position of the switch when the dynamo motor is running as a dynamo. When the pedal 18 is pressed, the switch connects said battery units in series, thereby producing a higher voltage to provide the torque necessary to start the engine shaft with the use of a small motor.

In the present example, the dynamo motor shaft operates, through a speed-reduction connection, presently to be described, a shaft 19 (see Figs. 1 and 2), which is connected by a suitable coupling 20 to a shaft 21, that in turn is connected by gearing inclosed in a casing 22 to the crank shaft 23 of the engine. Thus, when the dynamo motor is operating as a motor it acts to drive the engine crank shaft.

The speed reduction connection by means of which the dynamo motor shaft is operatively connected to the shaft 19 above referred to is constructed as follows:—24 indicates the shaft of the dynamo motor 11 (see Fig. 2) which is of familiar construction. Said dynamo motor is inclosed in a suitable casing 25 in the end walls of which the shaft 24 is rotatively mounted by means of suitable ball-bearings 24ª, 24ᵇ. The usual commutator 24ᶜ is engaged by brushes 24ᵈ (Fig. 9). The dynamo motor shaft 24 is prolonged forwardly beyond the dynamo motor casing, where it has mounted upon it a speed reduction gearing, indicated as a whole by the numeral 26, and comprising the following: On the shaft 24 adjacent to the end of the dynamo motor casing is rotatively mounted a disk 27 provided on its periphery with a forwardly projecting, annular flange 28 in the outer surface of which are formed ratchet teeth, the same thus constituting a ratchet gear 29. The disk 27 is recessed on its face adjacent the dynamo motor casing to receive a ball race 30 to provide an antifriction bearing for the ratchet gear disk on the shaft 24. Next adjacent to the front face of the disk 27 and within its flange 28 there is mounted loosely on the shaft 24 a floating eccentric plate 31 (see Figs. 3 and 4) provided with diametrically opposite, radially extending notches 32, 32. Within said notches engage pins 33, 33, projecting forwardly from the face of the disk 27, said pins as shown being secured in suitable recesses or apertures in said disk. The pins are preferably provided with antifriction sleeves 33ª which have direct bearing engagement with the sides of the notches 32.

On the shaft 24 adjacent to the front face of the floating eccentric plate 31 there is keyed (see Fig. 5) a cylindric sleeve 34, having its central axis placed eccentrically with respect to the central axis of the shaft. A large gear 35 having external teeth 36 is rotatively mounted on said sleeve, an antifriction roller cage 36ª being preferably interposed between said gear and the eccentric sleeve 34. 37, 37 indicate pins extending rearwardly from the rear face of the gear 35, and engaging in diametrically opposite, radially extending notches 38, 38 formed in the floating plate 31 intermediate the other notches 32, 32 therein, and, as shown, at angular distance therefrom of 90 degrees. As in the case of the other pins, sleeves 38ª are preferably placed on said pins to provide antifriction bearing between said pins and the sides of said notches. It is apparent that any rotative movement of the gear 35 will be communicated by the pins 37 to the floating plate 31 and thence through the pins 33 to the ratchet gear 29, while the said gear 35 may be moved radially in its plane by the eccentric sleeve on which it is mounted without effect on said ratchet gear, by reason of the radial play of said pins in their respective notches and of the floating movement of said floating plate.

At the forward end of the eccentric sleeve 34 there is fixed thereon an annular flange 40 (see Fig. 6) which carries a plurality of spring controlled pawls 42. Said pawls, as shown, are formed by radially arranged pins set in radial recesses 41 in the peripheral edge of the flange 40, there being, as shown, four of such recesses spaced apart at distances of 90 degrees. 43 indicates coiled springs interposed between the inner ends of the pins 42 and the bottoms of said recesses.

A flat ring 44 surrounds the flange 40 of the eccentric sleeve. Said ring has a plurality of ratchet teeth 45 on its inner circumference adapted for engagement by the spring controlled pawls 42.

46 indicates an internal gear rigidly attached upon the outer circumference of the flat ring 44, said ring and gear being non-rotatively connected together, as shown, by means of dowel-pins 47. Said internal gear is formed on an annular band 46ª, which projects forwardly and rearwardly beyond the plane of the ring 44, the rearward projection constituting the internal gear proper and having gear teeth cut on its inner periphery. Said gear part of the band is of reduced diameter and fits loosely within the flange of the disk 27 on which the ratchet gear 29 is formed. The internal gear 46 is of larger diameter than the external gear 35 with which it is engaged and the construction is such that as the eccentric sleeve 34 is rotated by the dynamo motor shaft 24, it will cause the external gear 35 to roll upon the internal gear 46, and, as said external gear, being of smaller diameter, has a less number of teeth than the internal gear 46, this rolling of the gear 36 about within the gear 46 will produce a relative rotative movement between the said external gear and the internal gear in opposite directions. Thus, if the shaft 24 rotates counter-clockwise as viewed in Fig. 5, indicated by the arrow 25[b] therein, the external gear 35 will be or tend to be rolled in the same direction (indicated by the arrow 50) and will be caused to rotate in the opposite direction, or clockwise (as indicated by the arrow 49) with reference to the internal gear 46. Should the external gear be held against rotation the rotative movement will be imparted to the internal gear in the direction of the arrow 49$^a$ (Fig. 5), and this rotation of the internal gear will be at a speed greatly less than that of the shaft 24, as is readily apparent, the reduction depending upon the difference between the number of teeth on the internal gear and the number of teeth on the external gear.

The internal gear is connected to the hereinbefore mentioned shaft 19, that is geared to the engine shaft, by means of an overload slip clutch, (see Fig. 3) indicated as a whole by the numeral 51. Said clutch includes a forwardly tapered member 52 fixed to the shaft 19 and rotatively mounted on the end of the dynamo motor shaft 24. The rear face of said member is recessed to receive the end of the shaft 24 and a ball-cage 52$^a$ is interposed in said recess to provide an antifriction bearing between the two parts. The other member of the clutch consists of a ring 54 tapered on its inner circumference to correspond with the taper of the first named clutch member, and held in yielding frictional engagement therewith by means of a flat ring 57 attached to the outer end of the band 46$^a$ on which the internal gear is formed, coiled springs 56 interposed to act longitudinally between the clutch ring 54 and the said flat ring 57, as shown. The rear face of the clutch ring is provided with a plurality of cylindric recesses 56$^a$ in which the coiled springs 56 are placed and the flat ring 57 is attached to the band 46$^a$ by means of screws 58. A washer 53 is interposed between the engaging surfaces of the clutch members.

It is apparent that the friction between the two clutch members is dependent upon the spring 56 which thus determines the rotative force that may be transmitted from one clutch member to the other.

Two spring controlled pawls 60 (see Figs. 2, 8 and 9) are mounted on the end wall of the dynamo motor casing in position for engagement with the ratchet gear 29, said pawls being normally held out of engagement by springs 60$^a$, but being adapted to be brought into engagement by the action of an electromagnet 61 energized by the storage battery and opposing said springs, when the current is directed into the dynamo motor to start the engine as will be presently described. Said pawls lock the ratchet gear 29 against movement and as this, as has been described, locks the external gear 35 against rotative movement, while still permitting the movement of said gear radially under the rotative movement of the eccentric sleeve 34 on which it is mounted, the relative movement between said external gear 35 and the internal gear 46 imparts a positive rotative movement to said internal gear in the direction opposite to that in which the gear 35 tends to turn, namely in the same direction as the dynamo motor shaft, as indicated by the arrow 49$^a$, in Fig. 5. This movement is likewise communicated to the flat ratchet ring 44 which is rigid with the internal gear 46. The dynamo motor shaft 24, rotating at a higher speed, rotates the pawl carrying flange 40 on the end of the eccentric sleeve 34 in the same direction and the yielding pawls 42, back ratcheting upon the ratchet teeth of the said ratchet ring 44, permit this difference in speeds. The rotative movement of the internal gear 46 is communicated through the clutch members 54, 51 to the shaft 19 and thence to the crank shaft of the engine, thus cranking the engine.

After the engine shaft has been started under its own power and worked up to speed, the ratchet ring 44 operated through the clutch members catches the pawls 42 and rotates the eccentric sleeve 34 and with it the shaft 24, thus operating the machine as a generator, the magnet 61 having been in the meantime deenergized so as to permit the pawls 60 under the action of the springs 60$^a$ to be raised so as to release the ratchet 29 which is now free to rotate idly.

The overload slip clutch interposed between the internal gear and the shaft 19 is important, since it limits the force that may be transmitted, thereby preventing the possibility of stripping the gear teeth or springing the parts in case of pre-ignition and back firing and the resultant reversed movement of the shaft 19.

The reduction gearing and clutch just described are inclosed in a casing 65 which is attached to the end of the dynamo motor casing. The shaft 19 is rotatably mounted in the end wall 66 of said casing, a ball bearing cage 67 being interposed to provide antifriction bearing between the parts.

On the shaft 19 adjacent to the end wall of the casing 65 is keyed a gear 68 which meshes with a gear 69 that operates the distributer and circuit breaker mechanism, indicated generally at 70, for the high tension ignition from which the engine is fired. As the shaft 19 is positively rotated, it will be apparent that any slipping of the clutch members by means of which this shaft is connected to the dynamo motor shaft will have no effect on the timing of the distributer and circuit breaker, as the said gear 68 always has the same definite timed relation with the movement of the pistons of the engine.

The electric circuits of my improved system are shown diagrammatically in Fig. 9, wherein the several parts that have been mentioned are indicated by the same letters of reference. The blade contacts of the movable member of the double throw switch, which is designated generally by the reference character 14 in Fig. 1, are indicated in Fig. 9 by the letters $a$ to $f$, inclusive, and one set of fixed blade contacts with which they are adapted to engage, by the letters A to F, inclusive, these being the contacts that are arranged to connect the battery units in series when the pedal controlling the double switch is pressed. The other fixed blade contacts are represented by the letters $A^x$ to $F^x$, with which the blades of the movable switch member are normally engaged and which are arranged to connect the battery units in multiple.

The contact $f$ of the movable switch member is connected to a shunt circuit $70^a$ which is adapted to energize the electro-magnet 61. The switch blade $F^x$ with which the contact $f$ normally engages, has no connection with the battery, so that when the movable switch member is in its normal position to which it is returned immediately after the pressure is removed from the foot pedal, the electro-magnet circuit is cut out and the magnet is deënergized, whereupon the springs $60^a$ withdraws the pawls 60 from their engagement with the ratchet gear 29 of the reduction gearing permitting said ratchet gear to turn freely. The fixed blade contacts A to F, with the exception of the contact E, are connected in series with a main 80, which includes a field winding 81 on the dynamo motor field in series with the armature and a return main $80^a$, so that the dynamo motor is operated as a motor when the movable member of the switch is in position with its contacts in engagement with the contacts A to F.

When the movable switch member is on the other side in engagement with the fixed contacts $A^x$ to $F^x$, the battery elements are connected in multiple by mains $80^x$, $80^y$, with the armature of the dynamo motor, and a shunt field winding 83 connected to the main $80^x$ at 84 is bridged across said mains by means of a wire 86 and the contacts $E^x$ and $e$ of the switch. In order to regulate the flow of current to the storage battery, provision is made as before stated to cut down the strength of the field of the dynamo electric machine by diminishing the current through the field winding. In the specific example here illustrated, this is accomplished by means of a compensating system which is interposed in the dynamo circuit and which is indicated generally at $86^x$. The mechanical parts comprise a relay cut out core 101 whose armature 102 is carried by lever 103, pivoted at 104 and normally pulled upwardly by spring 105 to open contacts 106. A second lever 107 pivoted at 108 below the first named lever has its right hand arm normally drawn downwardly by a spring 109 to close contacts 110. A resistance $110^a$ is bridged across contacts 110. From contacts $E^x$, the shunt field circuit may be traced through wire 111, contacts 110, lever 107, and return main $80^a$. Voltage winding 112 of the relay cutout core is bridged across mains $80^a$ and $80^x$ as shown. The battery main $80^y$ includes a winding 113 on the cutout core from which lead 114 goes to the lever 103, so that when the contacts 106 are closed connection with return main $80^a$ is completed. The operation of this compensating or regulating system will be described later.

One of the battery elements is always connected to a switch 85 which controls the engine ignition and to a switch $86^a$ which controls the lamp circuit. As shown, the movable contact member $a$ of the double-throw switch is connected by a wire 87 to both of said switches while its associated contact $a'$ is connected by a wire 88 to a condenser in the ignition circuit and to the ground. Thus the voltage of the current supplied both for ignition and for lighting will never be greater than that of one battery unit. Dry cells 90 are shown connected to the switch controlling the ignition for use in case of emergency.

In the circuit diagram, the high tension distributer is indicated at 170, high tension current being led thereto by wire 171 from the secondary of transformer 172, and being distributed thence to the spark plug (not shown) by way of leads 173. The transformer primary is connected by lead 174 to ground through interrupter or breaker 175. These connections are as usual and require no further description.

The operation of my improved starting device is apparent from the foregoing description. To start the engine, the foot pedal 18 is pressed which throws the switch 14 so as to connect the units of the storage batteries in series and start the dynamo motor as a motor, and also to energize the electro-magnet 61, thus causing the pawls 60 to engage the ratchet-gear 29 This throws in the reduction gearing connection between the dynamo motor shaft and the engine shaft and the dynamo motor starts the engine. As soon as the engine shaft works up to speed, it begins to and continues to drive the dynamo-motor shaft, the foot pedal 18 is released, and the switch 14 is caused by its spring to swing to its first position, cutting out the electro-magnet 61 and releasing the ratchet gear 29 of the reduction gear, connecting up the storage battery units in multiple as described. Should the foot treadle not be released as soon as the engine is started no harm will be done since pawls 60, though still held engaged with the ratchet gear 29 by the electro-magnet, will simply back ratchet thereon.

It will be noted that if the dynamo motor shaft be rotated without the pawls 60 being thrown into engagement with the ratchet gear 29, the movement of the gear 35 will be imparted idly to the ratchet gear 29 through the floating plate 31 and no rotative movement will be imparted to the shaft 19. The reduction gear connection may thus be termed idle in its normal condition, since the operation of the pawls 50 is required in order to bring it operatively into the system. Manifestly any means may be employed for actuating the said pawls when starting the engine, but the magnetic means described for operating said pawls is preferred since it may be easily controlled by the same member, namely, the switch member, which starts the dynamo motor.

The operation of the system for controlling and regulating the current is as follows: When the engine is at rest, the cut out core 101 is deënergized and the contacts 106 are open, contacts 110 being closed. The circuit between the dynamo electric machine and storage battery is thus open. When the engine has been started and the generator speeds up sufficiently to produce the necessary voltage, core 101 is energized by winding 112 and draws armature 102 downwardly to close contacts 106, thus completing the circuit between the dynamo electric machine and the battery. Current now flows through the dynamo mains, including coil 113 of the cut out core. If the rotative speed of the dynamo increases to a point where the charging current, or the battery potential or voltage, tends to become excessive, the coil 113 energizes the core 101 to such an extent that armature 102 is drawn still farther downward to turn lever 107 about its pivot and to open contacts 110. This throws resistance 110$^a$ into the generator field circuit and diminishes the flow of current through field winding 83. The field being thus weakened, the charging current decreases until armature 102 is again permitted to move upward to close contacts 110 and thereby to shunt the field resistance. In practice, this cycle of operation is repeated continually, the contact levers vibrating back and forth, and the charging current being thus kept constant within reasonable limits. It will be noted that the introduction of resistance 110$^a$ into the field circuit has the effect of reducing the voltage across the terminals of field winding 83. The result is, in effect, that the field circuit is supplied by gradually diminishing current in ratio to output and speed.

While in describing and illustrating my invention I have referred to certain details of construction and arrangement of the parts, it is to be understood that the invention is not limited thereto except as pointed out in the appended claims.

What I claim is:

1. In an electrical system, the combination with a dynamo electric machine, of a storage battery arranged to be charged by current from said electric machine, combined cutout and regulating means for closing and opening the circuit connecting said electric machine and battery and also for regulating the output of said electric machine, means for affecting said combined means in response to voltage fluctuations, and means for affecting said combined means in response to current fluctuations, said affecting means including means whereby the affecting means coöperate in the regulation of said electric machine.

2. In an electrical system, the combination with a dynamo electric machine provided with a field winding, of a storage battery arranged to be charged by current from said electric machine, automatically acting means depending upon the speed of said machine for closing and opening the charging circuit including said machine and battery, and automatically acting means responsive to an excessive voltage or an excessive amperage or both for regulating the excitation of said field winding.

3. In an electrical system, the combination with a dynamo electric machine provided with a field winding, of a storage battery arranged to be charged by current from said electric machine, and a combined cutout and regulator connected to the charging circuit including said electric machine and battery and comprising a magnetizable core, a winding on said core connected in series with said battery and said electric machine, a second winding on said core connected in shunt with said electric machine, and means acting in response to the magnetization of said core by said windings thereon for closing and opening the circuit including said battery and electric machine and also for regulating the flow of current to said field winding.

In testimony whereof I hereunto affix my signature.

JAMES K. DELANO.